United States Patent
Simonian

(10) Patent No.: US 8,290,879 B2
(45) Date of Patent: Oct. 16, 2012

(54) SYSTEM AND METHOD FOR ENABLING A FUNDRAISING AND CONTRIBUTIONS PROGRAM USING FUNDRAISING CARDS REDEEMABLE FOR BRANDED STORED-VALUE CARDS

(76) Inventor: Thomas A. Simonian, Batavia, IL (US)

(*) Notice: Subject to any disclaimer, the term of this patent is extended or adjusted under 35 U.S.C. 154(b) by 0 days.

(21) Appl. No.: 13/400,902

(22) Filed: Feb. 21, 2012

(65) Prior Publication Data

US 2012/0150690 A1 Jun. 14, 2012

Related U.S. Application Data

(63) Continuation of application No. 11/234,969, filed on Sep. 26, 2005, now abandoned.

(51) Int. Cl.
G06Q 99/00 (2006.01)
G06Q 10/00 (2012.01)
G06Q 30/00 (2012.01)

(52) U.S. Cl. .... 705/329; 705/11; 705/26.41; 705/14.11; 705/14.36

(58) Field of Classification Search ............ 705/1, 14, 705/35, 39, 40, 41, 65, 69
See application file for complete search history.

(56) References Cited

U.S. PATENT DOCUMENTS

| | | | | |
|---|---|---|---|---|
| 6,978,250 B1* | 12/2005 | Kawan et al. | ............ | 705/14.36 |
| 7,111,777 B2* | 9/2006 | Singhal | ............ | 235/380 |
| 2001/0007098 A1* | 7/2001 | Hinrichs et al. | ............ | 705/14 |
| 2003/0154163 A1* | 8/2003 | Phillips et al. | ............ | 705/39 |
| 2004/0039637 A1* | 2/2004 | Kopf et al. | ............ | 705/14 |
| 2004/0193485 A1* | 9/2004 | Ilberg | ............ | 705/14 |
| 2004/0249752 A1* | 12/2004 | Prato et al. | ............ | 705/41 |
| 2005/0261931 A1* | 11/2005 | O'Hara | ............ | 705/1 |
| 2006/0069619 A1* | 3/2006 | Walker et al. | ............ | 705/14 |
| 2006/0224454 A1* | 10/2006 | Kantor et al. | ............ | 705/14 |
| 2007/0012759 A1* | 1/2007 | Allarea et al. | ............ | 235/379 |
| 2007/0088657 A1* | 4/2007 | Greene | ............ | 705/39 |
| 2007/0198418 A1* | 8/2007 | Macdonald et al. | ............ | 705/52 |
| 2007/0203788 A1* | 8/2007 | Andalib et al. | ............ | 705/14 |
| 2007/0282697 A1* | 12/2007 | Kirby | ............ | 705/26 |

* cited by examiner

*Primary Examiner* — Gregory Johnson
(74) *Attorney, Agent, or Firm* — Eugene M. Cummings, P.C.

(57) ABSTRACT

Disclosed is a system and method for enabling a fundraising program using fundraising cards redeemable by not-for-profit organization ("NPO") supporters for branded stored-value cards. The system includes a scrip company host system having a server, where the server includes a microcontroller. A remote user device, having a display, is operatively coupled to the scrip company host system and configured to enable access to the scrip company web site. The microcontroller is adapted to detect access to the scrip company web site by a NPO, and cause the plurality of fundraising cards to be distributed to the NPO in response to detecting an order for the plurality of fundraising cards by the NPO. The fundraising cards are distributed to the NPO prior to receiving payment from the NPO for the fundraising cards, thereby making it unnecessary for the NPO to carry a paid-for inventory of fundraising cards.

10 Claims, 10 Drawing Sheets

SYSTEM AND METHOD FOR ENABLING A FUNDRAISING AND CONTRIBUTIONS PROGRAM USING FUNDRAISING CARDS REDEEMABLE FOR BRANDED STORED-VALUE CARDS

CROSS-REFERENCE TO RELATED APPLICATIONS

This application is a continuation application of U.S. patent application Ser. No. 11/234,969 filed Sep. 26, 2005 now abandoned and entitled "SYSTEM AND METHOD FOR ENABLING A FUNDRAISING AND CONTRIBUTIONS PROGRAM USING FUNDRAISING CARDS REDEEMABLE FOR BRANDED STORED-VALUE CARDS" and is hereby incorporated by reference in its entirety.

BACKGROUND OF THE INVENTION

The present invention relates generally to fundraising and contributions for not-for-profit organizations (NPOs), and more specifically to a system and method for enabling a fundraising and contributions program by NPOs using fundraising cards redeemable by NPO supporters for branded stored-value cards for use at specified merchant vendor locations.

Each year, thousands of schools, churches, organizations, associations and other NPOs participate in fundraising programs whereby negotiable gift certificates or cards have identifying means (commonly referred to as "scrip") are issued at a discount by national and local merchant vendors to NPOs, who then distribute the scrip to NPO supporters at an assigned value and/or at a premium price, the dollar value of the discount being retained by the NPO and/or shared with a third party supplier. Scrip programs are effective as fundraising tools because they generate revenue for NPOs, merchant vendors, and intermediary companies through purchases that NPO supporters would normally make in the ordinary course, i.e., they do not require supplemental expenditures from NPO supporters beyond what would be normal in the course of their everyday spending.

Traditional scrip programs operate via an inventory model whereby NPOs purchase scrip at a discount from the merchant vendors, sell the scrip at the assigned value to the NPO supporters, and retain the difference as fundraising proceeds. The most successful and profitable scrip programs for NPOs are those whereby NPOs stock a "retail store" of branded cards or certificates that a supporter can choose from and purchase on the spot. These programs are successful because there is no lag time between the supporters' payment for and the delivery of the card. The investment necessary, however, to carry an inventory of scrip that encompasses all of their supporters' needs is beyond the scope of most NPO budgets, and therefore relatively few NPOs use this "inventory model." Rather, roughly 95% of NPOs opt for a more cumbersome 6-step model by which the NPO gathers and consolidates scrip orders and corresponding payments from its supporters, places the orders with a scrip broker, waits for and receives the scrip and, finally, distributes the scrip to its supporters, a process which may take up to four weeks. Only truly committed NPO supporters will consistently participate in these programs. Further, because of their labor-intensive nature, these programs offer a relatively limited array of brands and are often poorly administered or abandoned by NPOs, resulting in loss of the fundraising opportunities.

From the scrip company's point of view, the critical weakness of the traditional model is its razor-thin gross profit margin (approximately 1-2%), which fails to capture potential breakage and float, and difficulty in accurately forecasting inventory needs. In the traditional model, "breakage" (the economic benefit realized when purchased scrip is never or not fully utilized) and "float" (the economic benefit resulting from the passage of time between payment for and redemption of the card) are captured by the merchant vendors and not the scrip company.

More recently, non-scrip fundraising business models have been adopted which allow NPO supporters to make purchases from a wide array of merchant vendors, either online and/or using a traditional credit card, whereby a percentage of the purchase value is paid by the merchant vendor to a designated NPO. These non-scrip programs obviously reduce the administrative burden on the NPOs: the NPOs are, in fact, nearly eliminated from the fundraising process. That advantage, however, is a double-edged sword, because NPO supporters respond more often and more generously to face-to-face sales pitches encouraging on-the-spot acceptance or refusal, especially if the pitches are made at or in the context of specific NPO events or undertakings in which the NPO supporters have personal interests (e.g., parents being asked to purchase scrip to raise funds for their childrens' sporting teams). The abovementioned non-scrip programs are sometimes developed and marketed by intermediate companies charged with administering the programs, where the intermediate company is compensated via a [commission payment] from the merchant vendors. Obviously, there is no potential under these non-scrip models to capture breakage and float.

Finally, the traditional scrip methods do not effectively leverage existing computer and communications technologies to efficiently provide additional NPO customer service solutions via an easily navigable website administered by the scrip company.

The market potential for scrip fundraising is estimated at over $1 billion, yet because no existing model offers both NPOs and scrip companies an efficient and profitable alternative, only about 10,000 of the 800,000 registered NPOs in the United States currently take advantage of this fundraising channel, resulting in a gross under-realization of revenues and limitation of resources for NPOs acting generally in the public interest.

SUMMARY OF THE INVENTION

The invention is generally directed to a system and method for enabling an NPO fundraising and contributions program using fundraising cards, redeemable by NPO supporters for branded stored-value cards, gift cards, merchandise, travel, etc. While referred to herein as "fundraising cards", it should be appreciated by one skilled in the art that any suitable medium, including a computer medium, capable of associating a unique identifying code with a script transaction, may be used in the system and method for enabling an NPO fundraising and contributions program.

In an embodiment, provided is a system and method for enabling a fundraising program using fundraising cards redeemable by NPO supporters for branded stored-value cards. The system includes a scrip company host system commissioned by a scrip company. The scrip company host system includes a server configured to host a scrip company web site, where the server includes a microcontroller, and a remote user device operatively coupled to the scrip company host system and is configured to enable access to the scrip company web site. The remote user device includes a display.

The microcontroller is adapted to detect access to the scrip company web site by the NPO, cause the plurality of fundraising cards to be distributed to the NPO in response to detecting an order for the plurality of fundraising cards by the NPO. The fundraising cards are distributed to an NPO prior to receiving payment from the NPO for the fundraising cards. Each of the fundraising cards is then delivered to corresponding NPO supporters upon receipt by the NPO of an assigned value of the each of the plurality of fundraising cards. The microcontroller is also adapted to activate the plurality of fundraising cards to form a plurality of activated fundraising cards upon receipt of a payment from the NPO for the plurality of fundraising cards, where the payment from the NPO equal to the assigned value of the plurality of fundraising cards less a first discount. The microcontroller is further adapted to cause the array of merchant vendors to be paid the assigned value of the plurality of fundraising cards less a second discount, and enable redemption of the plurality of activated fundraising cards for the plurality of branded stored-value cards.

In another embodiment, provided is a system for enabling a fundraising program using a plurality of unique identifying codes redeemable for a plurality of services for use by not-for-profit organization (NPO) supporters. The plurality of services is provided by an array of service providers. The system includes a scrip company host system commissioned by a scrip company. The scrip company host system includes a server having a microcontroller configured to host a web site. The system also includes a remote user device operatively coupled to the scrip company host system and configured to enable access to the web site. The remote user device includes a display and an input device. The microcontroller is adapted to detect access to the web site by the NPO, and cause the plurality of unique identifying codes to be distributed to the NPO in response to detecting an order for the plurality of unique identifying codes by the NPO via the scrip company. The unique identifying codes are distributed to the NPO prior to receiving payment from the NPO for the unique identifying codes, and each of the plurality of unique identifying codes are delivered to corresponding NPO supporters upon receipt by the NPO of at least a full value payment associated with of each of the plurality of unique identifying codes. The microcontroller is further adapted to activate the plurality of unique identifying codes to form a plurality of activated unique identifying codes upon receipt of an NPO payment from the NPO for the plurality of unique identifying codes, cause the array of service providers to be paid, and enable redemption of the plurality of activated unique identifying codes for the plurality of services.

In another embodiment, provided is a method for enabling a fundraising program using a plurality of fundraising cards redeemable for a plurality of branded stored-value cards for use by not-for-profit organization (NPO) supporters at an array of merchant vendors. The method includes detecting access to a web site by the NPO, causing the plurality of fundraising cards to be distributed to the NPO in response to detecting an order for the plurality of fundraising cards by the NPO via the web site. The fundraising cards are distributed to the NPO prior to receiving payment from the NPO for the fundraising cards, and each of the plurality of fundraising cards is delivered to corresponding NPO supporters upon receipt by the NPO of at least an assigned value of the each of the plurality of fundraising cards. The method also includes activating the plurality of fundraising cards to form a plurality of activated fundraising cards upon receipt of a payment from the NPO for the plurality of fundraising cards, causing the array of merchant vendors to be paid, and enabling redemption of the plurality of activated fundraising cards for the plurality of branded stored-value cards.

DESCRIPTION OF PREFERRED EMBODIMENT

Figure 1:
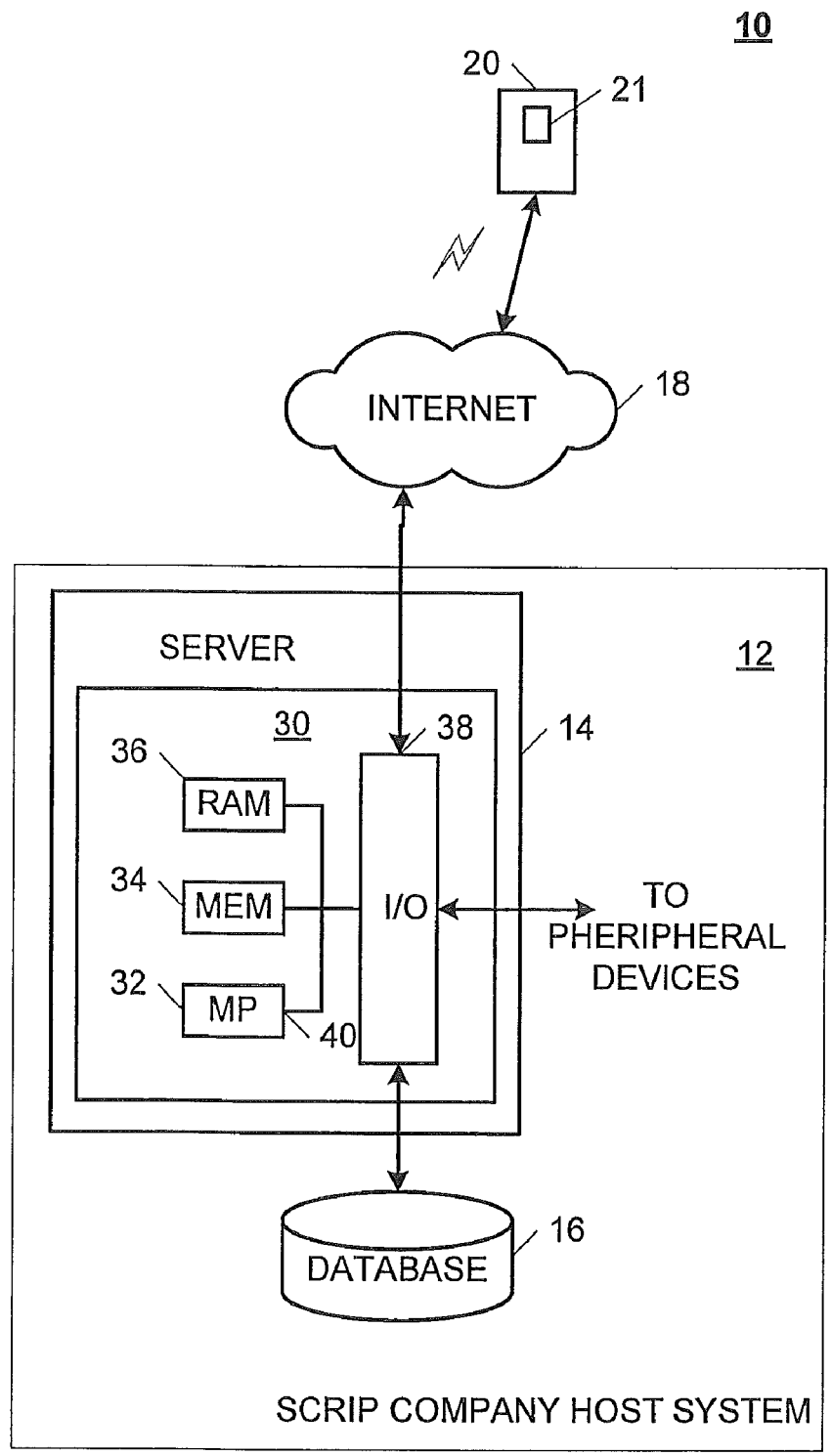
FIG. 1 is a block diagram of an exemplary system for enabling a fundraising program using fundraising cards redeemable for branded stored-value cards, according to an embodiment of the invention.

In general, the embodiments of this invention provide a system and method for enabling a fundraising and contributions program using customized fundraising cards redeemable for a branded stored-value card(s), gift cards, merchandise, travel, etc. As noted above, the term fundraising cards is defined herein to include any suitable medium capable of associating a unique identifying code with a script transaction. Utilizing the system and method for the charity fundraising and contributions program enables: (1) an NPO supporter to purchase fundraising cards that may have been customized to include NPO logos, photographs, graphics, information regarding NPO events and fundraising goals, (2) an NPO supporter to purchase a gift card, either in person or online via a particular website, redeemable for any number of valued items including merchandise, travel related items such as airline tickets, hotels and automobile, etc. (3) special merchant offers (4) administration of loyalty rewards programs, (5) NPO special event reminders, (6) newsletter access, (7) access to NPO promotional materials and fundraising advice, and (8) customizable thank-you notes for distribution to NPO supporters.

More specifically, the embodiments of the invention include a system and a method for (1) providing a scrip company website configured to enable NPOs to choose, design and order fundraising cards, in a specified denominations and quantities, redeemable for branded stored-value cards usable at a wide array of specified retail stores, or redeemable for gift cards, merchandise, travel, etc., (2) detecting entry of the scrip company's website by an NPO (3) in response to an order placed by the NPO for a quantity of fundraising cards, causing the fundraising cards to be delivered to the NPO, (4) enabling electronic activation of the fundraising cards upon verification of receipt of payment for the fundraising cards from the NPO, via the scrip company website and an Automatic Clearing House, of the assigned value of the fundraising cards less a first discount, (5) enabling redemption of the fundraising cards for branded stored-value cards, which when received by an NPO supporter (or any designee of the NPO supporter), are redeemable for merchandise at one or more associated retail stores selected by the NPO supporter from a wide array of retail stores displayed via the scrip company's website, and (6) enabling payment by the scrip company to the one or more associated retail stores of the assigned value of the branded stored-value card less a second discount. Upon payment to the one or more associated retail stores of the branded stored-value card less the second discount, the branded stored-value card are physically delivered by the scrip company to the NPO supporter (via mail or other courier means). Upon receipt of the branded stored-value card(s), the NPO supporter or designee may redeem the branded stored-value card(s) at the corresponding retail store(s).

The embodiments of the invention also include a system and a method for hosting a plurality of fundraising and/or contribution websites configured to enable NPO supporters to purchase gift cards redeemable for merchandise, travel, etc., and/or configured to enable selection of a charity from among of plurality of charities to whom any profits or credits will go. The NPO supporter may be directed to the website(s) by the NPO, by the charity, or by any suitable means (e.g., print advertisement, television advertisement). Selection of the various choices may be facilitated using drop-down menus, user selectable links, dialog boxes and the like. Accumulated profits or credits may then be passed along to the selected charities and/or NPO via one of any number of suitable means such as a check, a wire transfer of money, a gift card, etc.

FIG. 1 is a block diagram of an exemplary system 10 that may be used to enable a fundraising program using fundraising cards, or any suitable medium capable of associating a unique identifying code with a script transaction, redeemable for branded stored-value cards, merchandise, travel, etc., according to an embodiment of the invention. The system 10 allows an NPO supporter with access to the Internet to participate in the fundraising program. As described below, unlike prior art fundraising systems, implementing the system described herein makes it unnecessary for the NPO to carry a paid-for inventory of fundraising cards.

Referring to FIG. 1, the system 10 includes a scrip company host system 12 having a server 14 coupled to an optional database 16. A scrip company or scrip company representative establishes the scrip company host system 12. Among other things, the server 14 is adapted to host a scrip company website. In general, the system 10 is configured to allow an NPO or NPO supporter, having a suitably configured remote user device 20 such as a laptop computer, desktop computer, a personal digital assistant (PDA), a mobile telephone, to name a few, to access the scrip company website via an access network 18. Although illustrated as the Internet, the access network 18 may be one of any number of suitable networks (e.g., a wired Ethernet network, a wireless Code Division Multiple Access network) known in the art, enabling communication between the remote user device 20 and the scrip company host system 12.

The remote user device 20 includes a microcontroller (not separately illustrated) and a display 21 operatively coupled to the microcontroller. The display 21 is adapted to display images received from, or caused to be displayed by, the scrip company host system 12. The server 14 includes a microcontroller 30 that may include a microcontroller-based platform or microprocessor (MP) 32, a program memory 34 (including a read only memory (ROM)), a random-access memory (RAM) 36 and an input/output (I/O) circuit 38, all of which may be interconnected via a communications link, or an address/data bus 40.

The input/output (I/O) circuit 38 provides an interface between the server 14 and the remote user device(s) 20, and between the server 14 and the optional database 15 using one of any number of well known interface protocols. The I/O circuit 38 may also provide the interface between the server 14 and one or more peripheral devices such as a keyboard, a display, a printer, and a mouse.

Among other things, the microprocessor 32 is capable of causing scrip company web pages to be displayed on the display 21 to the NPO or NPO supporter. The RAM 40 is capable of storing event data or other data used or generated during execution of the method for enabling the fundraising program using fundraising cards redeemable for branded stored-value cards. The program memory 24 is capable of storing program code that controls the operation of the server 14 during execution of the method for enabling the fundraising program using fundraising cards redeemable for branded stored-value cards.

Although only one microprocessor 32 is shown, the microcontroller 30 may include multiple microprocessors. Similarly, additional memory (e.g., flash memory) may be included, depending on the requirements of the server 14. The RAM(s) 36 and program memory(ies) 34 may be implemented as semiconductor memories, magnetically readable memories, and/or optically readable memories, etc. Although an NPO and an NPO supporter likely utilize different remote user devices, for ease of discussion both the NPO and the NPO supporter(s) use the same remote user device 20.

One manner in which the server 14 of the scrip company host system 12 may operate is described below in connection with one or more flowchart(s) that represents a number of portions or routines of one or more computer programs, which may be stored in one or more of the memories of the microcontroller 30. The computer program(s) or portions thereof may also be stored remotely, outside of the server 14 and may therefore control the operation from a remote location.

Figure 2:
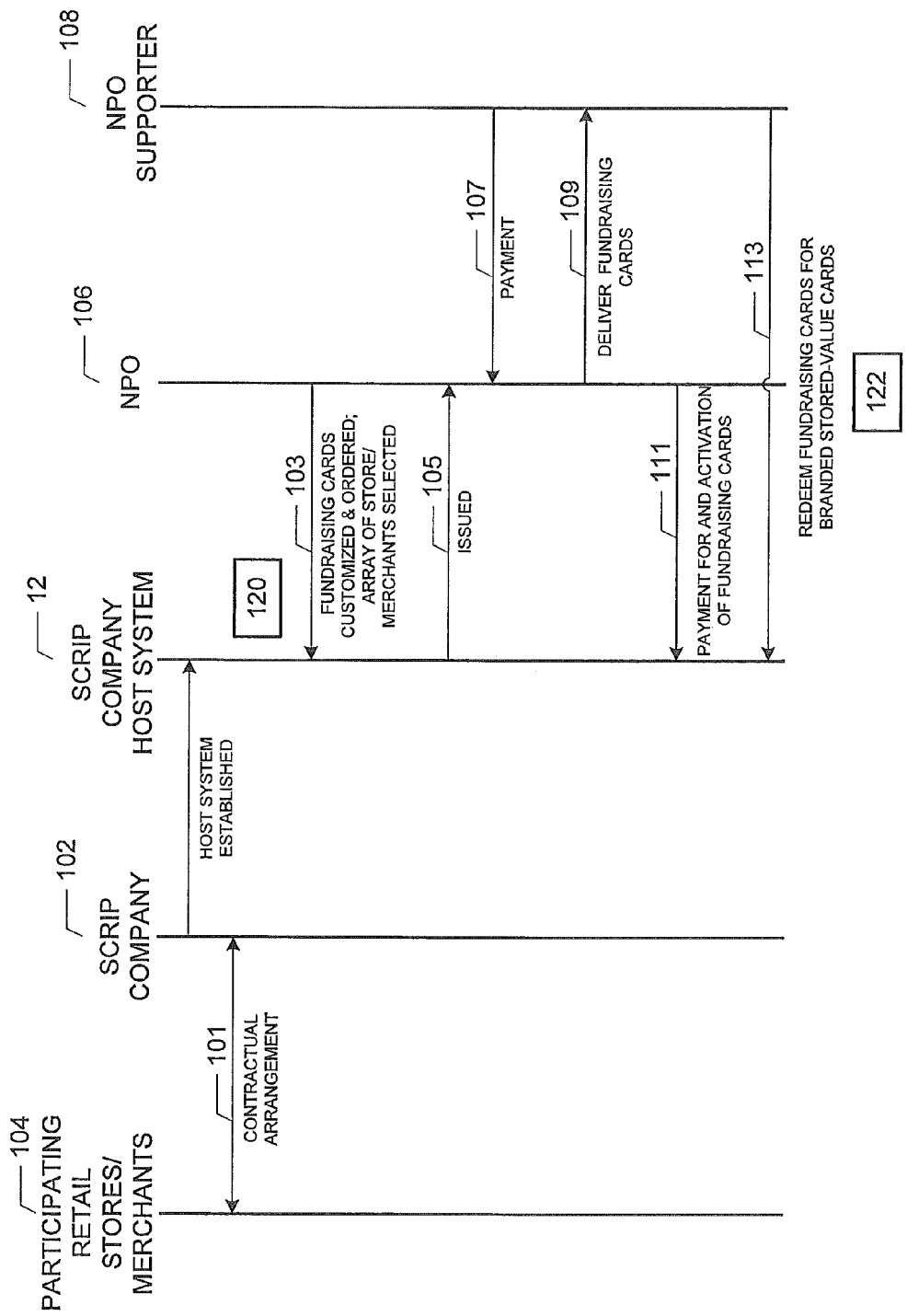
FIG. 2 is a block diagram of fundraising elements and their interaction during the method for enabling a fundraising program using fundraising cards redeemable by NPO supporters for branded stored-value cards, according to an embodiment of the invention.

For ease of discussion, FIG. 2 illustrates a ladder flow diagram 100 of a fundraising program using fundraising cards redeemable by NPO supporters for branded stored-value cards, according to an embodiment of the invention. The ladder flow diagram 100 illustrates the interaction between the various participants of the fundraising program and the scrip company host system 12. As mention above, a scrip company 102 or its representative provides the scrip company host system 12 and hosts a scrip company website accessible by NPOs and NPO supporters.

Referring to FIG. 2, a contractual arrangement 101 previously established and executed between the scrip company 102 and participating merchant vendors 104 allows the participating merchant vendors 104 to participate in the fundraising program flow 100. Under such a contractual arrangement 101, the scrip company 102 agrees to pay the participating merchant vendors 104 the assigned value of corresponding branded stored-value cards, less an agreed-upon discount. The agreed-upon discount is the scrip company's remuneration and profit.

An NPO 106 wishing to participate in the fundraising program accesses the scrip company's website (hosted by the scrip company host system 12) via his/her remote user device 20, and registers or logs-in to select and order 103 fundraising cards 120, in denominations and quantities specified by the NPO from an array of choices. The NPO chooses an array of merchant vendors from the participating merchant vendors 104 at which the branded stored-value cards (to be issued in exchange for the fundraising cards) may be used. The NPO 106 has an option to customize the fundraising cards with selected graphics. Such customized fundraising cards may therefore reflect the NPO's fundraising goals or upcoming special events for which funds are being raised.

After receiving the order 103 for fundraising cards 120 from the NPO 106, the scrip company host system 12 causes the fundraising cards 120 to be printed via a printer operatively coupled to the scrip company host system 12. The fundraising cards 120 are electronically numbered for identity purposes. The fundraising cards 120 are then issued 105 to the NPO 106 without requiring payment therefore. As a result, the NPO 106 is provided with a convenient inventory solution whereby the fundraising cards 120 are inventoried by the NPO 106 without any significant out-of-pocket expense by the NPO 106.

Upon payment 107 of the full assigned value to the NPO 106, the fundraising cards 120 are delivered 109 to the NPO supporter 108. After delivery of the fundraising cards to the NPO supporters 108, the NPO 106 accesses the scrip company's website and activates 111 the delivered fundraising cards 120. Activation may be accomplished using one of any number of suitable methods such as entering the identity numbers of the fundraising cards 120 via a web page hosted by the scrip company's website. Activation permits the bearer of the fundraising card 120 (e.g., the NPO supporter 108) to redeem the fundraising card 120 for a branded stored-value card(s) via the scrip company's website 112. During or prior to activation of the fundraising cards 120, the NPO provides payment to the scrip company 102 via the scrip company website (backed by an Automatic Clearing House). As previously mentioned, the payment by the NPO 106 to the scrip company 102 is the assigned value of the fundraising cards, less a first discount. As a result, without bearing the burden of carrying a pre-paid inventory of branded stored-value cards, the NPO 106 realizes a profit based on the difference between the full assigned value amount of the fundraising card(s) 120 paid by the NPO supporter and the lesser amount paid by the NPO 106 to the scrip company.

After the distributed fundraising cards 120 have been activated 111, an NPO supporter 108 can access the scrip company's website and redeem 113 the distributed fundraising cards for branded stored-value cards 122 usable at the array of retail merchant vendors. In addition, using the scrip company's website, the NPO supporter 108 may use his/her major credit card to add value beyond the value of the fundraising card 120 (i.e., to purchase a branded stored-value card 122 worth more than the original customized fundraising card). The NPO supporter 108 may also elect to have the branded stored-value card 122 delivered to a third party as a gift, along with a customized gift card or message.

FIGS. 3-10 are an exemplary flowchart of method 200 for enabling a fundraising program using fundraising cards 120, or any suitable medium capable of associating a unique identifying code with a script transaction, redeemable by NPO supports for branded stored-value cards 122 (and/or merchandise, travel, etc.), that may be performed by the microcontroller 30 of FIG. 1, according to an embodiment of the invention. Unlike prior art fundraising methods, the method 200 makes it unnecessary for the NPO to carry a paid-for inventory of fundraising cards.

Figure 3:
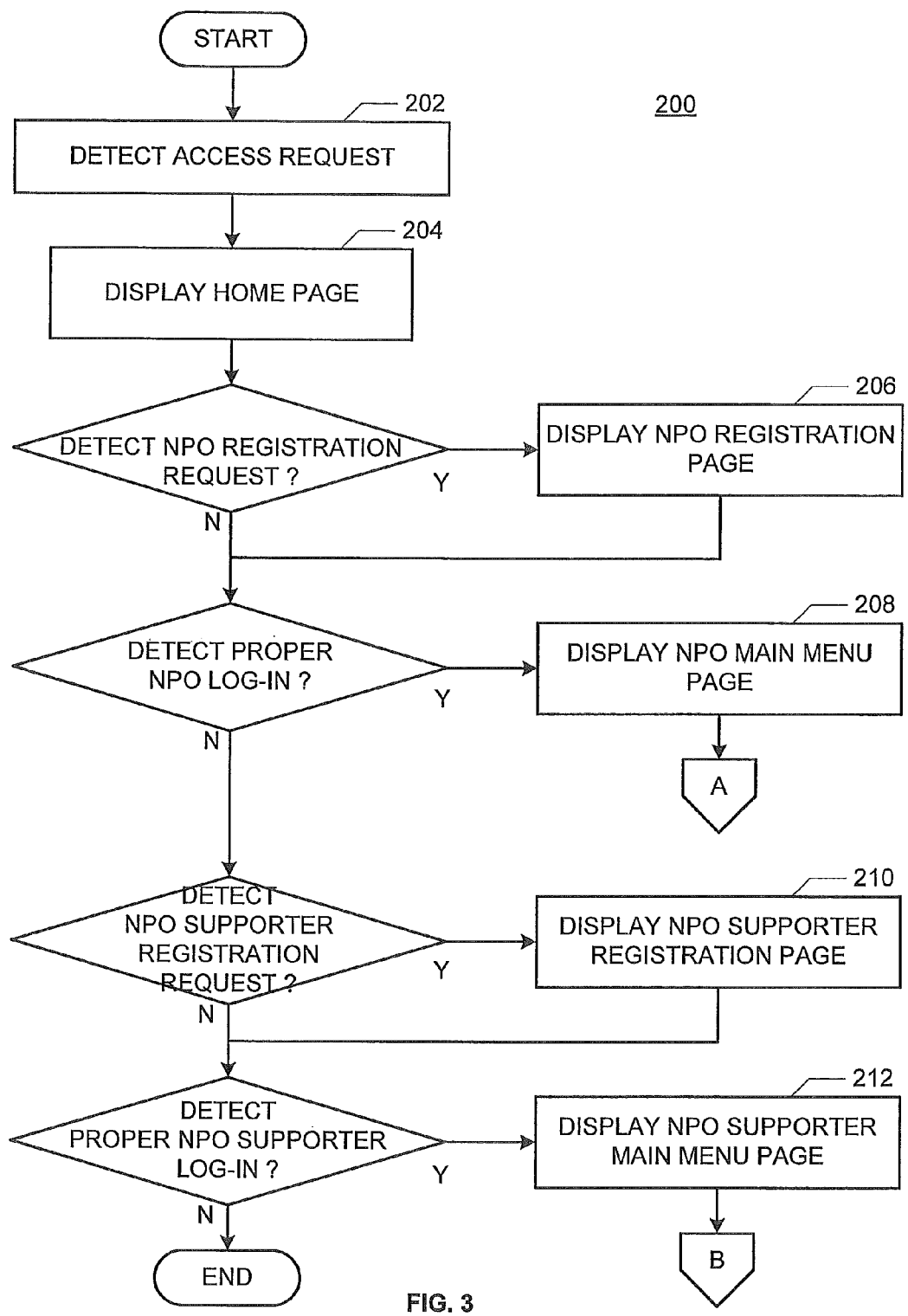
FIGS. 3-10 are an exemplary flowchart of a method for enabling a fundraising program using fundraising cards redeemable by NPO supports for branded stored-value cards that may be performed by the system of FIG. 1, according to an embodiment of the invention.

Referring to FIG. 3, the method 200 begins when the microcontroller 30 detects an access request via NPO 106 or NPO supporter 108 entry of the server's 14 unique Uniform Address Locator by means of the remote user device 20 (step 202). In response to the access request, the microcontroller 30 causes a Scrip Fundraising Home page to be displayed via a display means such as the display 21 (step 204). The Scrip Fundraising Home page includes, among other things, registration request options selectable by NPOs or NPO supporters for subsequent access to the scrip company website hosted by the scrip company host system 12.

Upon detection of selection of the NPO registration option from the Scrip Fundraising Home page, the microcontroller 30 causes an NPO Registration page to be displayed to the NPO via the display 21 (step 206). The NPO Registration page is configured to allow the NPO 106 to enter identifying and payment information about the NPO 106 to gain subsequent access to the scrip company website. After registering via the NPO Registration page, the NPO 106 may log-in to the scrip company website.

Upon detection of proper log-in information from the NPO 106, the microcontroller 30 causes an NPO Main Menu page to be displayed to the user via a display means such as the display 21 (step 208). Among other things, the NPO Main Menu page includes a number of selectable options such as, for example, an option to order fundraising cards 120, an option to activate fundraising cards 120 and an option to display other services to assist the NPO. As a result, the NPO 106 can 1) customize and order fundraising cards, 2) activate and pay for fundraising cards, 3) access related service options such as loyalty rewards programs, newsletters, promotional and fundraising materials and advice and customizable thank-you notes for delivery to NPO supporters, and 4) modify any NPO fundraising or event-specific information specified to the server for communication to the public via the website. Although preferably configured with drop-down menus, it is contemplated that the NPO Main Menu page and associated NPO pages may be configured with one of any number of well-known user-friendly configurations.

Figure 4:
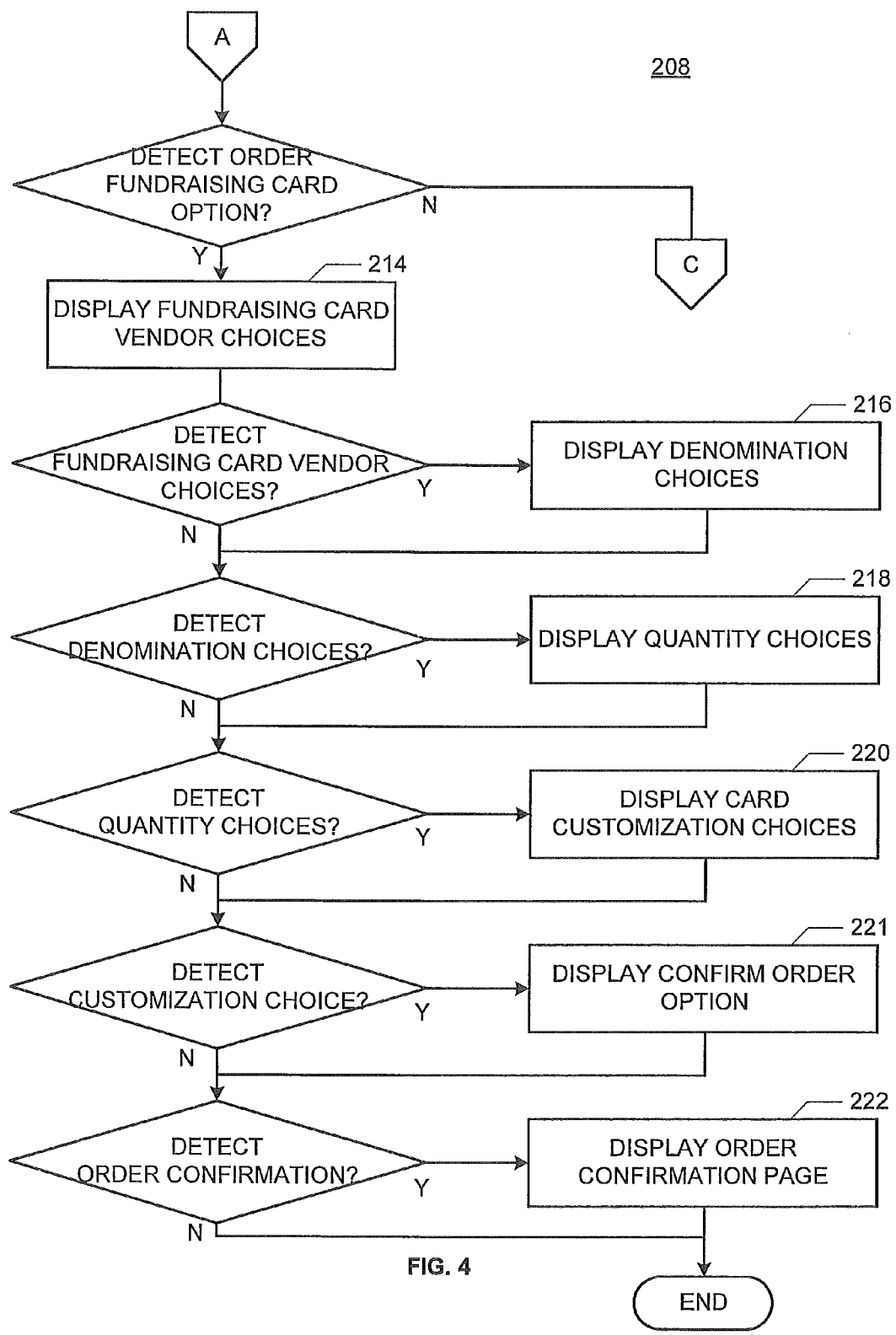

Referring to FIG. 4, upon detecting selection of the order fundraising card option, the microcontroller 30 causes the fundraising card merchant vendor choices to be displayed to the NPO 106 (step 214). The NPO 106 can then select an array of merchant vendors from the participating merchant vendor choices. Upon detecting selection of the array of retail merchant vendors, the microcontroller 30 causes a number of denomination choices to be displayed to the NPO 106 (step 216). The denomination choices enable the NPO 106 to select one or more denominations payable by the NPO supporter(s) 108 for the fundraising cards.

Upon detecting selection of one or more denomination choices, the microcontroller 30 causes a number of quantity choices to be displayed to the NPO 106 (step 218). The quantity choices enable the NPO 106 to select the quantity of fundraising cards 120 for each of the chosen denominations. For example, the NPO 106 may desire to purchase 100 fundraising cards having a $50 denomination, and 150 fundraising cards having a $25 denomination.

Upon detecting selection of one or more quantity choices, the microcontroller 30 causes a number of card customization choices to be displayed to the NPO 106 (step 220). The card customization choices enable the NPO 106 to customize the fundraising cards (to form customized fundraising cards) with a variety of logos, themes, artwork and other such design features to make the card informative or attractive to the NPO supporters 108. Upon detecting selection of one or more customization choices, the microcontroller 30 causes a confirm order option to be displayed to the NPO 106 (step 221). The confirm order option provides the NPO 106 with an option to confirm the customized fundraising card order. Upon detecting selection of the confirm order option, the microcontroller 30 causes a confirmation page to be displayed to the NPO 106 (step 222).

Figure 5:
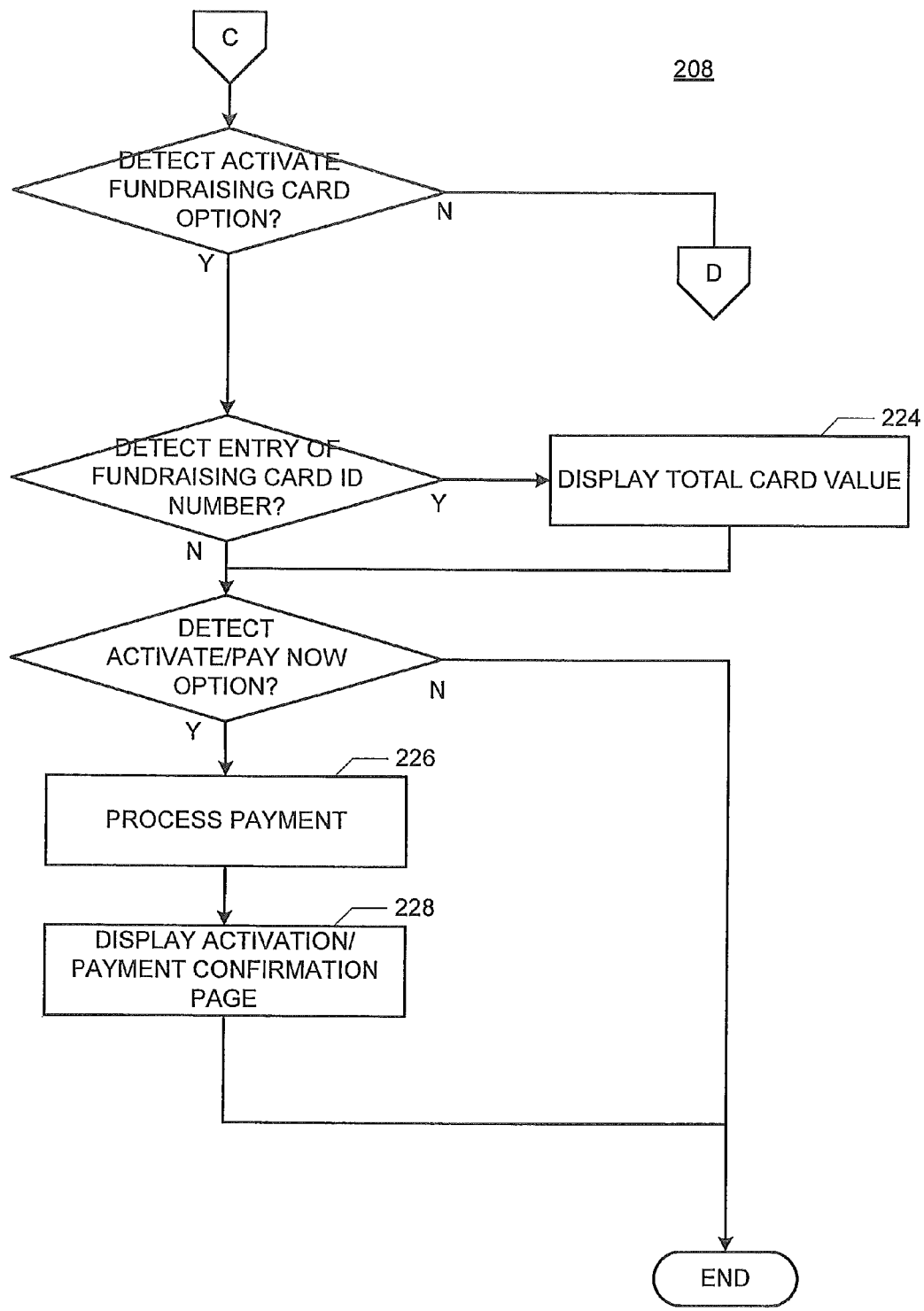

As noted in connection with FIG. 3, the NPO Main Menu page also includes an option to activate the fundraising cards, selectable after the NPO support(s) 108 have paid the NPO 106 the full assigned value of the distributed fundraising cards 120, and the NPO 106 has paid the scrip company 102 the assigned value of the distributed fundraising cards 120, less the first discount (see, FIG. 2). Referring to FIG. 5, upon detecting selection of the activate fundraising card option and detecting entry of the identification numbers assigned to the distributed fundraising cards 120, the microcontroller 30 causes the total assigned value of the distributed fundraising cards, less the first discount, to be displayed to the NPO 106 (step 224). As noted in connection with FIG. 2, during or prior to activation of the distributed fundraising cards, the NPO 106 provides payment to the scrip company 102 via the scrip company website (backed by an Automatic Clearing House) using, for example, a wire transfer, credit card transaction, telecheck, online bank transfer, or the like. Thus, upon detecting selection of an activate/pay now option by the NPO, the microcontroller 30 cause the payment by the NPO 106 to be processed (step 226). Upon completion payment processing, the microcontroller 30 causes an activation/payment confirmation page to be displayed to the NPO 106 (step 228).

Figure 6:
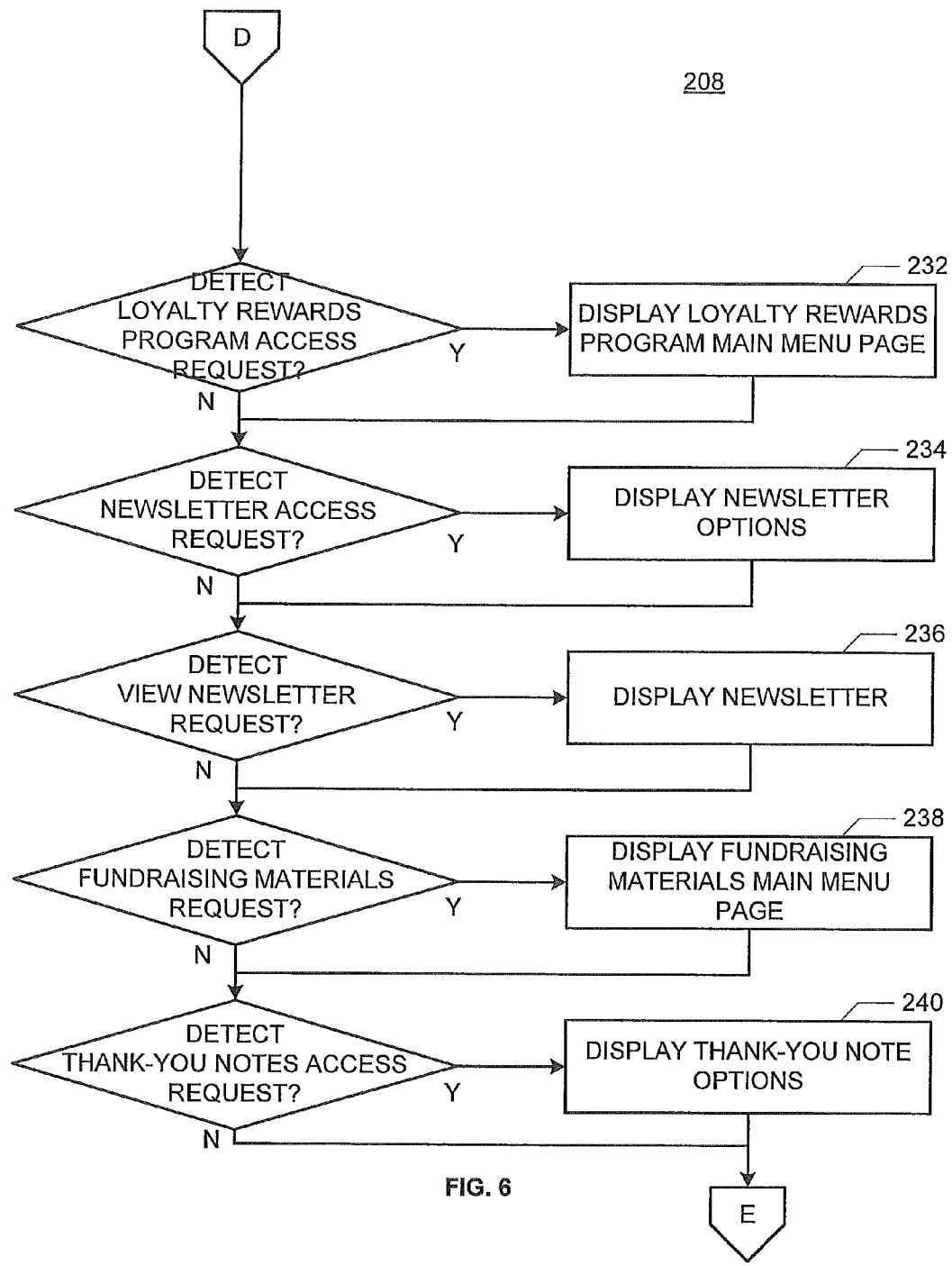
Figure 7:
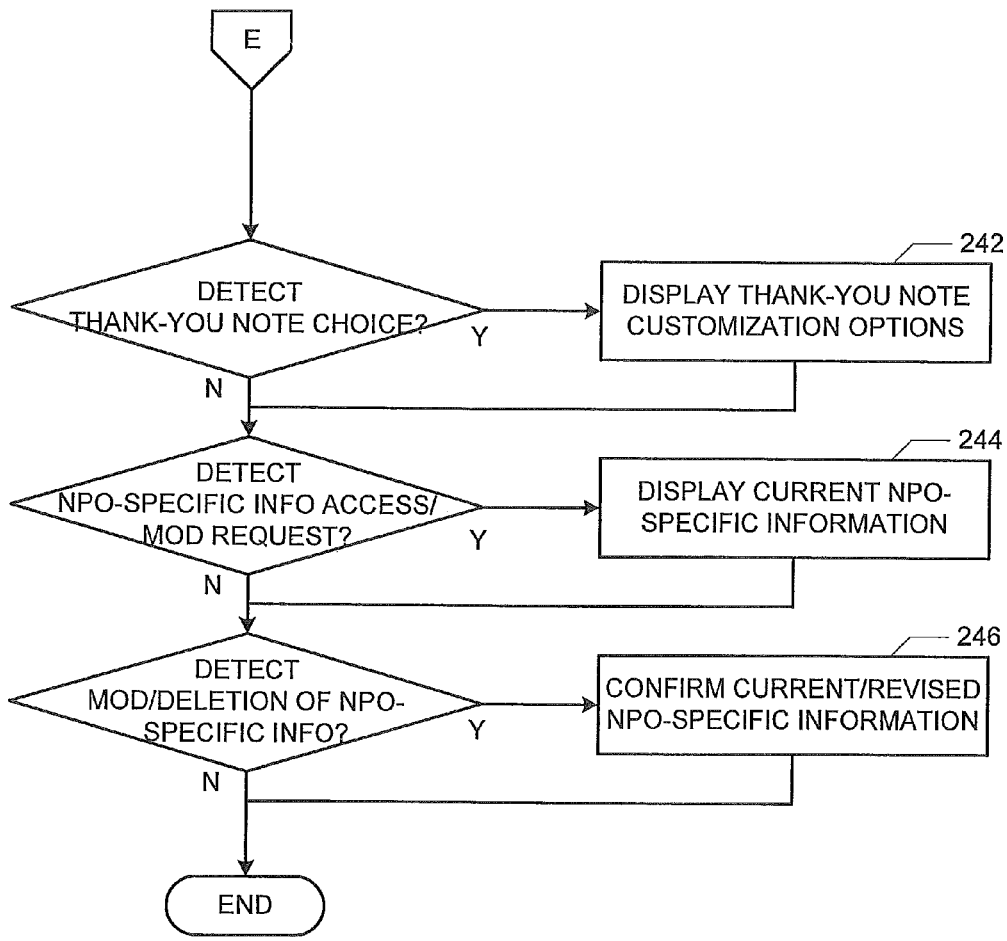

As noted in connection with FIG. 3, the NPO Main Menu page further includes an option to display services to assist the NPO 106 in administering the fundraising program. Among other things, the services include loyalty rewards programs, newsletters, fundraising materials and advice, and providing NPO-specific fundraising details. Referring to FIG. 6, upon detecting selection of a loyalty rewards program access request, the microcontroller 30 causes a Loyalty Rewards Program Main Menu page (step 232).

The Loyalty Rewards Program Main Menu page enables the NPO 106 to participate in a rewards program and also enables the NPO 106 to access newsletters. Upon detecting selection of a newsletter access request, the microcontroller 30 causes newsletter options to be displayed to the NPO 106 (step 234. Upon detecting selection of a view newsletter request, the microcontroller 30 causes the selected newsletter to be displayed to the NPO 106 (step 236).

The NPO 106 may also choose to access fundraising materials via the NPO Main Menu page. Accordingly, upon detecting selection of a fundraising materials request, the microcontroller 30 causes a Fundraising Materials Main Menu page to be displayed to the NPO 106 (step 238). The Fundraising Materials Main Menu page includes a visual presentation of available fundraising material. In addition, the NPO 106 may choose to access thank you note options that include customization options, artwork, etc. Upon detecting selection of a thank-you notes access request, the microcontroller 30 causes thank-you note options to be displayed to the NPO 106 (step 240). Similarly, upon detection of a thank-you note choice, the microcontroller 30 causes thank-you note customization options to be displayed (step 242).

The NPO 106 also has access to their NPO-specific information via the NPO Main Menu page. Thus, upon detecting selection of an NPO-specific information access/modification request, the microcontroller 30 causes current NPO-specific information to be displayed (step 242), and upon detecting modification or deletion of the NPO-specific information, the microcontroller 30 confirms the current or revised NPO-specific information (step 246).

Referring again to FIG. 3, upon detection of selection of the NPO Supporter Registration option from the Scrip Fundraising Home page, the microcontroller 30 causes an NPO Supporter Registration page to be displayed to the NPO supporter 108 via a display means such as the display 21 (step 210). The NPO Supporter Registration page is configured to allow the NPO supporter 108 to enter identifying and payment information for subsequent access to the scrip company website. After registering via the NPO Supporter Registration page, the new NPO supporter 108 may log-in to the scrip company website.

Upon detection of proper log-in information from the registered NPO supporter 108, the microcontroller 30 causes an NPO Supporter Main Menu page to be displayed to the NPO supporter 108 (step 212). Among other things, the NPO Supporter Main Menu page includes a number of selectable options such as, for example, an option to redeem fundraising cards, an option to view NPO-specific information and an option to display newsletters. As a result, the NPO supporter 108 can 1) redeem a fundraising card 120 for a corresponding branded stored-value card 122, 2) access NPO-specific fundraising information communicated via the website, and 3) access available newsletters. Although preferably configured with drop-down menus, it is contemplated that the NPO Supporter Main Menu page may be configured with one of any number of well-known user-friendly configurations.

Figure 8:
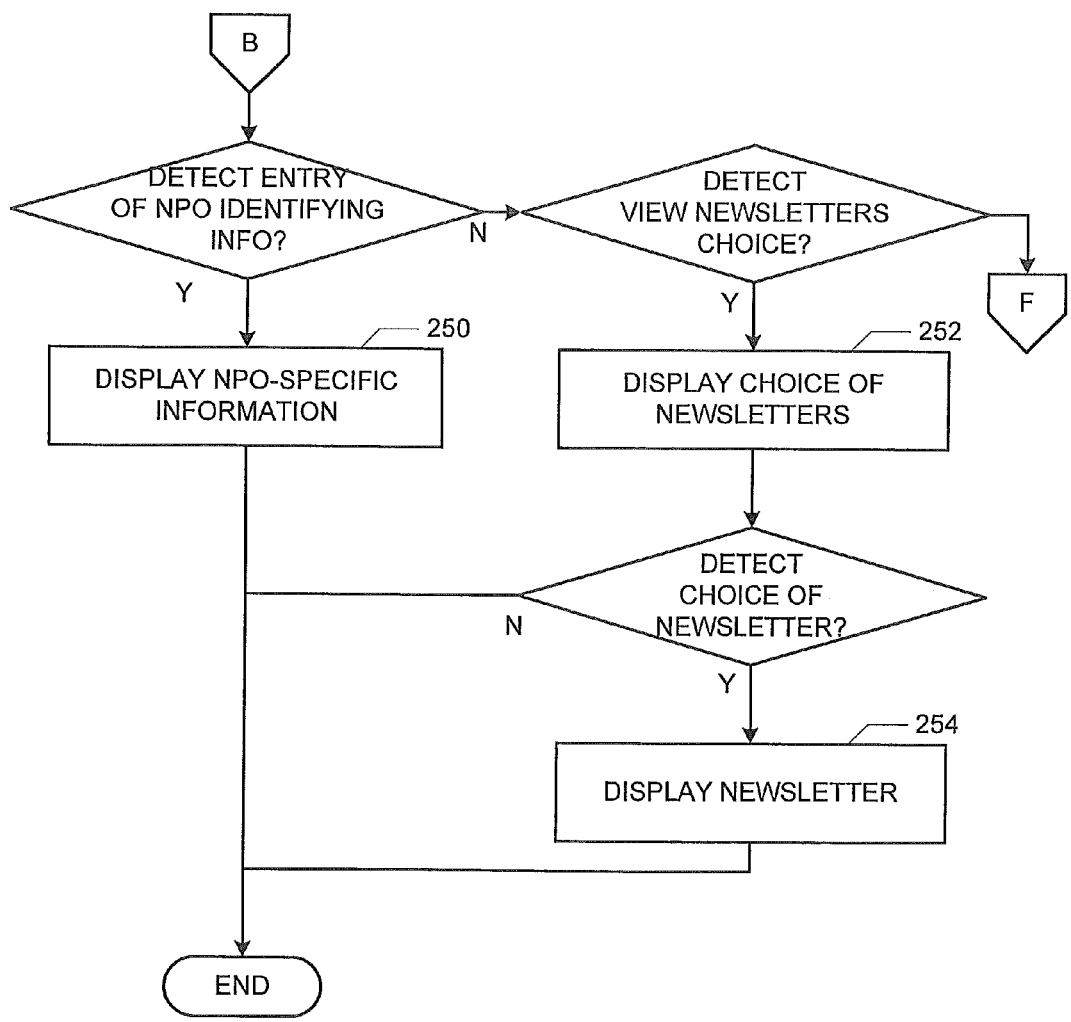
Figure 9:
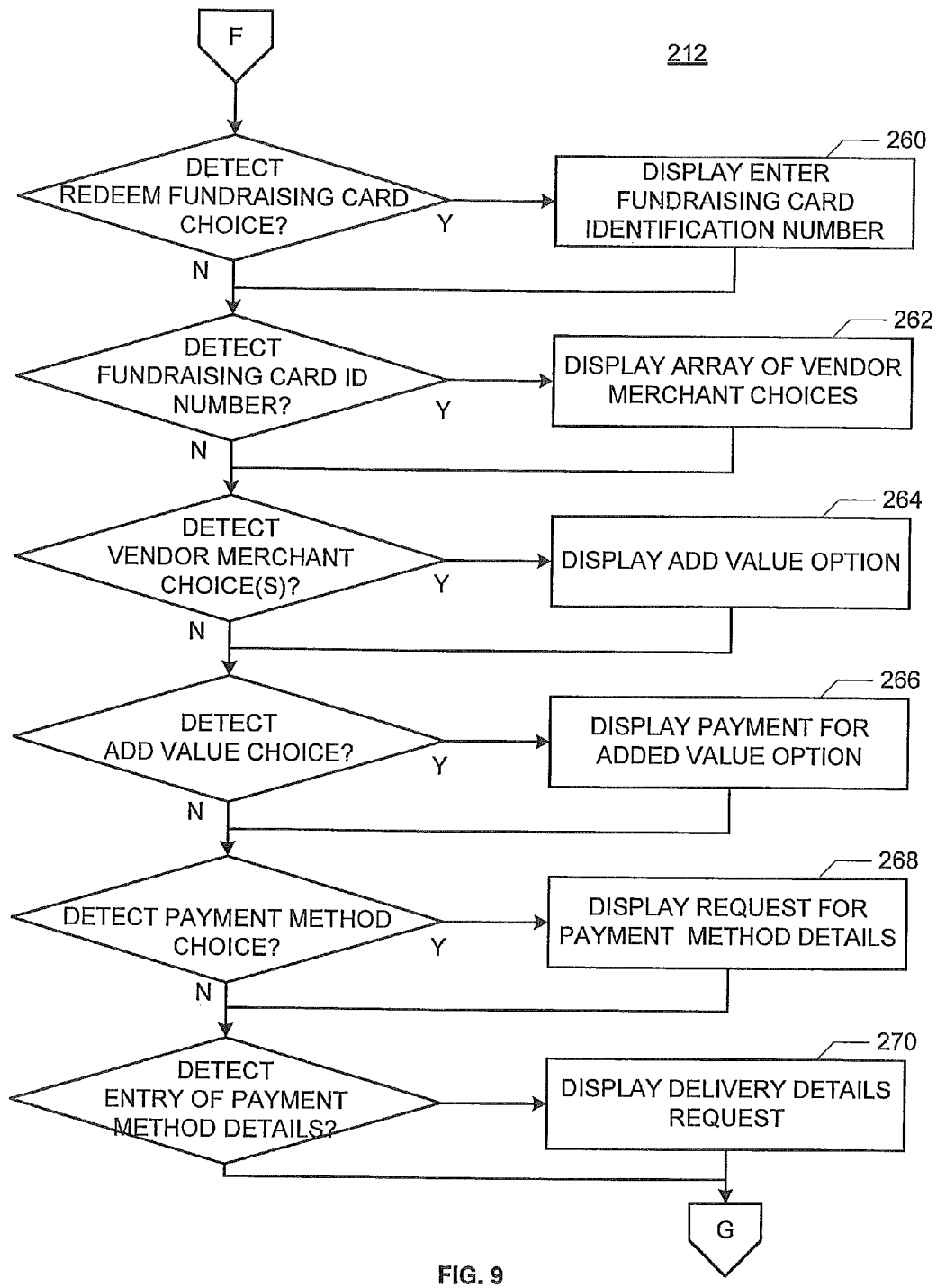
Figure 10:
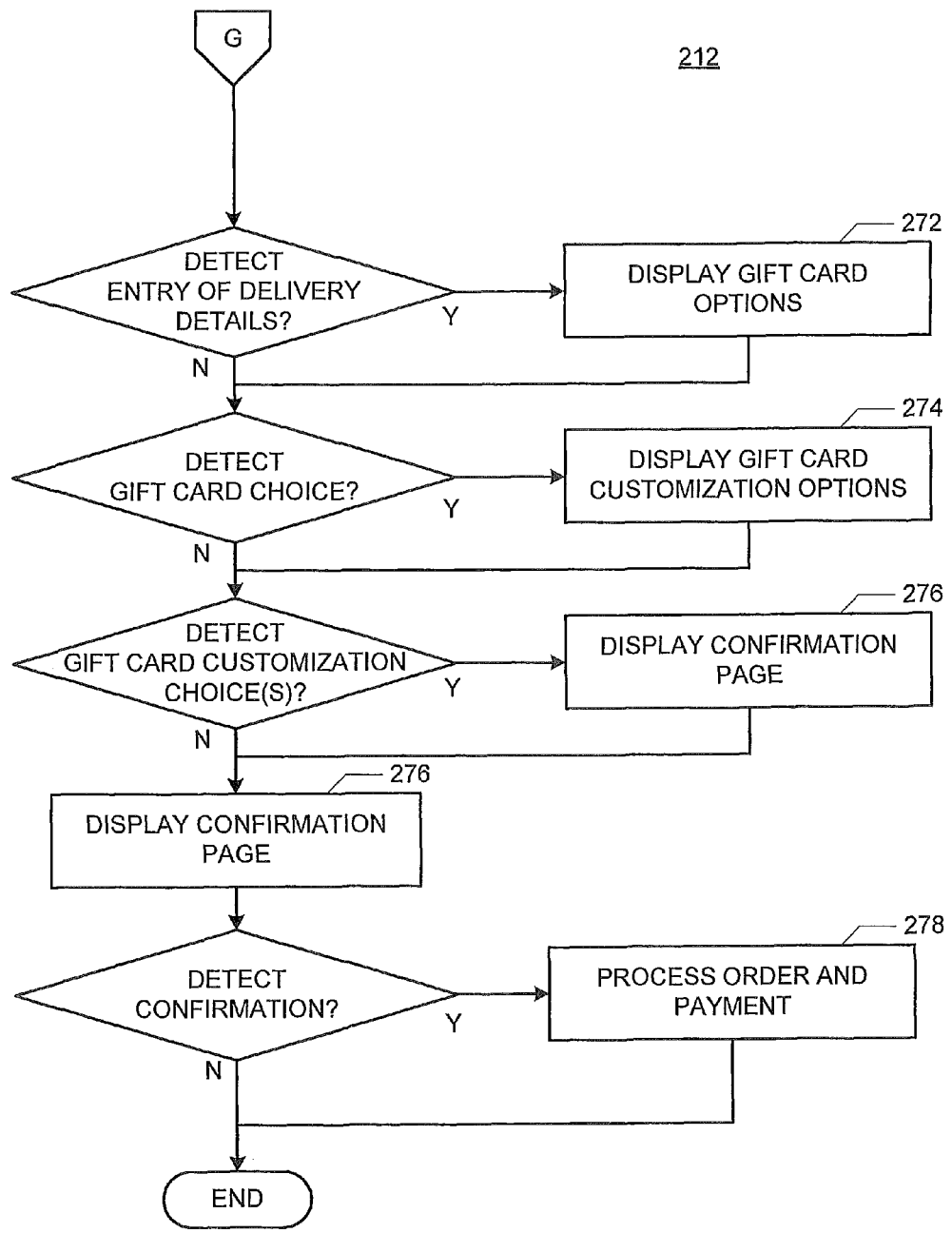

Referring to FIG. 8, upon detecting entry of NPO identifying information, the microcontroller 30 causes the NPO-specific information to be displayed to the NPO supporter 108 (step 250). Similarly, upon detecting entry of a view newsletter choice, the microcontroller 30 causes a choice of newsletters to be displayed (step 252), and upon detecting selection of one of the newsletters, the microcontroller 30 causes the newsletter to be displayed (step 254) to the NPO supporter 108.

As noted in connection with FIG. 2, after paying for and receiving the fundraising cards 120, the NPO supporters 108 can redeem the fundraising cards 120 for branded stored-value cards 122 via accessing the NPO Supporter Main Menu page. Accordingly, upon detecting a redeem fundraising card choice, the microcontroller 30 causes a prompt to be displayed (step 254) to the NPO supporter 108 to enable the NPO supporter 108 to enter his/her fundraising card(s) identification number(s) (step 260). Upon detecting entry of the customized card(s) identification number(s), the microcontroller 30 causes the array of merchant vendors to be displayed to the NPO supporter 108 (step 262). Upon detecting selection of a retail merchant vendor(s) from the array of retail merchant vendors, the microcontroller 30 causes an add value option to be displayed to the NPO supporter 108 (step 264). This option allows the NPO support 108 to add value to the fundraising card 120, thereby increasing the value of the branded stored-value card 122. Such an option may be attractive to an NPO supporter 108 intending to give the branded stored-value card 122 as a gift.

Upon detecting a value choice, the microcontroller 30 causes the payment for the added value option to be displayed to the NPO supporter 108 (step 266). Upon detecting a payment method choice, the microcontroller 30 causes a request for payment method details to be displayed to the NPO supporter 108 (step 268). Upon detecting entry of payment method details, the microcontroller 30 causes a delivery details request to be displayed (step 270), and upon detecting entry of delivery details by the NPO supporter 108, the microcontroller 30 causes branded stored-value gift card options to be displayed to the NPO supporter 108 (step 272). The NPO supporter 108 may elect to customize the branded stored-value gift card 122. Accordingly, upon detecting the gift card choice, the microcontroller 30 causes gift card customization options to be displayed to the NPO supporter 108 (step 274). The NPO supporter 108 may then select customization options for the branded stored-value gift card.

When all NPO selections are completed, the microcontroller 30 causes a confirmation page to be displayed (step 276), and upon detecting confirmation of the NPO supporter selections, processes the order and/or additional payments (step 278). Confirmation pages such as the confirmation page displayed at step 276 may be made available each time an affirmative selection is made.

As may be apparent from the above discussion, the system and method for enabling a fundraising program using fundraising cards 120 redeemable by NPO supporters 108 for branded stored-value cards 122 overcomes the problems associated with prior art scrip fundraising.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

It is claimed:

1. A system for enabling a fundraising program using a plurality of uniquely coded fundraising cards redeemable for a plurality of branded store-value cards for use by not-for-profit organization (NPO) supporters, the system for use with remote user devices and a network, the system comprising:
a scrip company server for hosting a website, the server including a microprocessor having a microcontroller wherein the microcontroller:
causes said plurality of uniquely pre-coded fundraising cards to be distributed to the NPO in response to an order placed by the NPO from a user device through said network, said cards distributed to said NPO prior to receiving payment from said NPO for an assigned value of said cards and prior to being associated with a store brand;
activates said cards upon entry of its unique code by said NPO from a user device through said network after said NPO receives payment from a NPO supporters for delivery of activated cards to said NPO supporters;
detects reentry of said unique code, by an associated NPO supporter from a device through said network for redemption of each of said activated cards for a store branded card issued by merchant vendors; and
initiates delivery of said store brand cards to said associated NPO supporter.

2. The system as defined by claim 1 wherein the microcontroller is further adapted to cause said merchant vendors to be paid.

3. The system of claim 1, wherein the payment from the NPO is equal to the assigned value of the plurality of fundraising cards less a first discount.

4. The system of claim 3, wherein the first discount is determined via a contractual arrangement between the NPO and the scrip company prior to detecting access to the scrip company web site by the NPO.

5. The system of claim 3, wherein the first discount is variable based on a denomination of the each of the plurality of fundraising cards.

6. The system of claim 1, wherein the merchant vendors are paid at least the assigned value of the plurality of fundraising cards less a second discount.

7. The system of claim 6, wherein the second discount is determined via a contractual arrangement between the scrip company and said merchant vendors prior to detecting access to the scrip company web site by the NPO.

8. The system of claim 1, wherein the array of merchant vendors is are selected by the NPO from a plurality of participating merchant vendors.

9. The system of claim 1, wherein the microcontroller is further adapted to:
cause a NPO Registration page to be displayed in response to detecting an NPO registration request, the NPO Registration page receives identifying and payment information from the NPO; and
cause a NPO Main Menu page to be displayed in response to detecting proper NPO log-in information based on the NPO identifying information.

10. The system of claim 9, wherein the NPO Main Menu page includes an order fundraising card option, an activate fundraising card option and a display other NPO services option.

* * * * *